Figure 1:
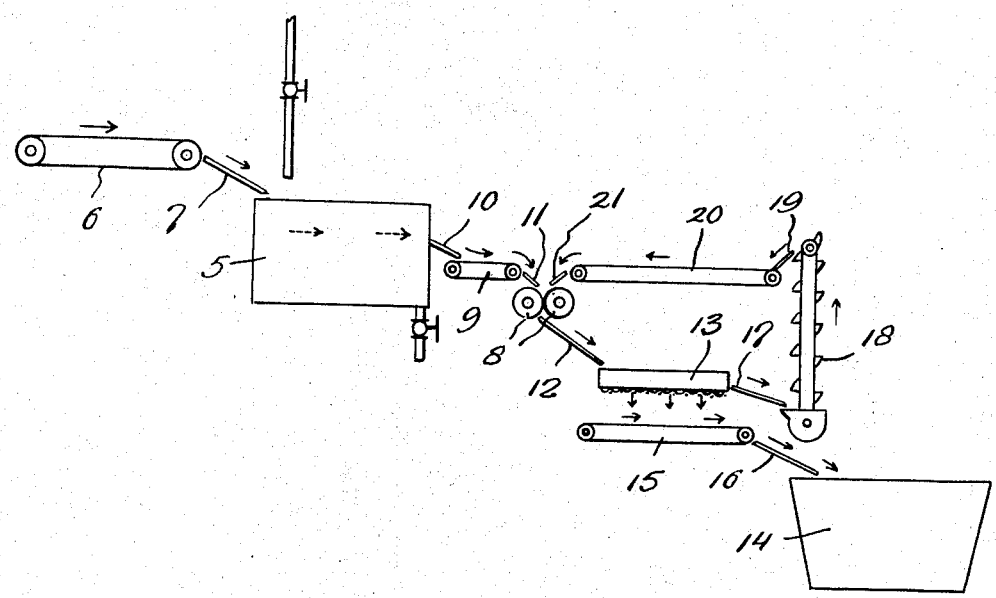

Nov. 2, 1937.   G. F. HORTON   2,097,979
PROCESS OF MAKING LIME
Filed Jan. 13, 1936

Inventor
George F. Horton,
By J. Stanley Burch
Attorney

Patented Nov. 2, 1937

2,097,979

UNITED STATES PATENT OFFICE 2,097,979

PROCESS OF MAKING LIME

George F. Horton, Houston, Tex.

Application January 13, 1936, Serial No. 58,964

2 Claims. (Cl. 263—53)

This invention relates to an improved process of producing lime by the calcining of oyster shells and the like.

Heretofore, in the production of lime from oyster shells and the like, it has been customary to crush the oyster shells or the like and thereafter burn the crushed shells or the like in a conventional rotary kiln embodying a cylinder inclined from one end to the other and rotatable to agitate the pieces of shell or the like and continuously convey them through the kiln during the burning process, the burning being accomplished by the direct action of a flame on the pieces of shell or the like, which flame is projected into the cylinder of the kiln substantially from one end thereof to the other. Due to this actual burning operation by the direct action of a flame on the pieces of shell or the like, it has been necessary to screen and wash the crushed shells to eliminate or remove the small particles which would otherwise be passed to the kiln and be over-burned during the calcining operation. Obviously, the inability to make use of the small particles of crushed shell results in the waste of an enormous quantity of material from which lime could be produced if over-burning thereof could be prevented.

The primary object of the present invention, therefore, is to provide an improved process of making lime from oyster shells or the like, whereby the small particles of shells may be calcined along with the larger pieces thereof without danger of over-burning such small particles, thereby making use of these small or finer particles which are ordinarily wasted, and rendering it unnecessary to screen and wash the crushed shells to eliminate the small particles or remove the latter from the larger pieces of shells before heating the latter in a kiln to calcine them or convert them from carbonates to oxides. I accomplish this object primarily by subjecting the washed reef-run shells or crushed shells, from which the small shell particles have not been eliminated, to the action of heat by a roasting operation as distinguished from the direct action of a flame or a burning operation. As my process excludes the usual burning operation or the usual direct action of a flame on the crushed shells, over-burning of the small particles is rendered highly unlikely, the degree of heat being properly controlled so as to not be excessive, and the roasting operation being prolonged for a sufficient period of time and while continuously agitating the shells and small particles thereof to insure thorough calcining of the same without danger of over-burning such small particles. In accordance with my process, the shells and small particles thereof are simply washed to remove therefrom the dirt or impurities which usually accompany the same when removed in commercial supplies by mechanical dredging apparatus from reefs. The washed shells and small particles may then be calcined, or they may first be fed to a suitable crusher or crushing rollers so as to reduce them to pieces of desired sizes and other relatively smaller particles. If the shells are crushed, they may be screened to limit the maximum size thereof, the pieces smaller than a given size together with the smaller particles being supplied in batches to a rotary kiln in which the shells are subjected to a roasting heat devoid of direct contact with a flame or with hot surfaces capable of burning the shells and small particles thereof. In this way, the calcining of the shells is accomplished by a roasting operation as distinguished from a burning operation, and the roasting operation is continued for a proper period of time while controlling the heat to avoid excessive temperatures, so that over-burning of the fine or small particles of shells is prevented, particularly as the shells are continuously agitated during the roasting operation. If the shells are crushed, the pieces thereof above the mentioned maximum size may be returned to the crusher or crushing rolls so as to be properly reduced to the required extent. Obviously, my process avoids the necessity of washing and screening the shells before the calcining operation to eliminate or remove the small particles of shells, and makes it possible to make use of such small particles which are ordinarily wasted because of the danger of over-burning the same in apparatus and by processes heretofore employed.

Figure 2:
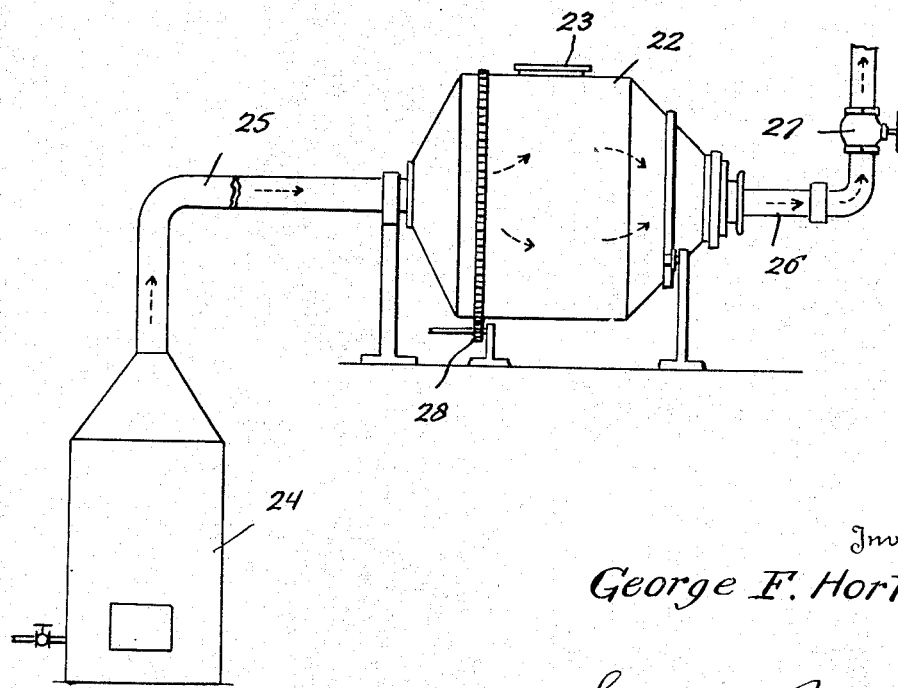

Other objects of the invention will be apparent to those skilled in the art, when the following description is considered in connection with the accompanying drawing, wherein:

Figure 1 is a diagrammatic elevational view illustrating one form of apparatus suitable for carrying out certain steps that may be included in the present process; and Figure 2 is a somewhat similar view, drawn on a larger scale, showing the apparatus for roasting the shells and small particles thereof to calcine them, after subjecting them to the washing operation, or to the washing, crushing and screening operations performed by the apparatus illustrated in Figure 1.

Commercial supplies of oyster shells occur in reefs and are usually removed by mechanical dredging equipment. Such removal obviously picks up small particles of shells and dirt and other impurities which have accumulated with the shells. In practicing the present invention, it is essential that this dirt and these impurities be substantially removed from the shells and particles thereof. Therefore, as shown in Figure 1, the shells and shell particles are delivered to a washer generally indicated at 5, as by means of a conveyor 6 and chute 7. After the shells and small particles thereof have been cleaned by the washer 5, they may be calcined, or they may first be passed to a crusher or crushing rolls 8 so as to be reduced to pieces of suitable size for calcining. Any suitable means such as a conveyor 9 and chutes 10 and 11 may be provided for conveying the shells from the washer 5 to the crushing rolls 8. The crushing rolls 8 not only reduce the shells to pieces of suitable size for calcining, but also break the shells into considerable other small particles which must ordinarily be removed or eliminated because of danger of over-burning the same when calcined in accordance with prior processes by the use of an ordinary rotary kiln in which the crushed shells are subjected to the direct action of a flame for burning. From the crushing rolls 8, the crushed shells may be conveyed by a chute 12 to a suitable screening device 13 for limiting the maximum size of the pieces of shell collected for the calcining operation. The pieces smaller than a given size, together with the small particles, pass through this screening device and may be collected in a suitable receptacle 13 for use in making lime. A conveyor 15 and chute 16 may deliver these pieces and small particles of shell from the screening device 13 to the receptacle 14. Any piece of shell larger than the mentioned maximum size may be returned to the crushing rolls 8 for being further crushed and thereby reduced to usable sizes. This may be accomplished by means of a chute 17 arranged to deliver the pieces of greater than desirable size to an elevator 18 which in turn discharges onto a chute 19, the chute 19 conveying the pieces of shell to a conveyor 20 that in turn discharges onto a chute 21 arranged to direct the shells back between the crushing rolls 8.

While a particular diagrammatic arrangement of apparatus has been illustrated in Figure 1, it is to be understood that the same is merely illustrative and that widely different apparatus may be used. The essential purpose of Figure 1 is to show that, in accordance with the present process, the shells are first washed or cleaned, after which they may be crushed and then cleaned so that the pieces smaller than a given size and the still smaller particles are collected for use in the production of lime, any pieces larger than a given size being crushed again to smaller size before they are collected and used in the production of lime. It will be noted, however, that the small particles are not removed or eliminated, but are collected with the larger pieces of proper size or of smaller than a given maximum size, for being calcined.

The shells or pieces of crushed shells, together with the accompanying small particles, collected in the receptacle 14, are then subjected to a roasting operation for being converted from carbonates to oxides, such roasting operation being accomplished by subjecting the crushed shells to the action of heat while agitating the same, as distinguished from subjecting them to the burning action of a flame. This roasting operation is preferably accomplished by means of a kiln of the type disclosed in my co-pending application for U. S. Letters Patent Serial Number 28,179 filed June 24, 1935. As broadly illustrated in Figure 2, this kiln includes a roasting drum 22 having a removable closure 23 to facilitate the introduction of batches of clean shells or crushed shells and small particles into the same or discharge of the lime therefrom. The shells in the drum 22 are roasted by subjecting them to heat without bringing them in direct contact with a flame or hot surfaces capable of burning the shells. In other words, the shells are not actually burned, but are merely highly heated and thereby roasted. By properly regulating this heat while agitating the shells and subjecting them to the heating operation for a properly prolonged period of time, the desired calcining operation is accomplished. One manner of roasting the shells is to supply a heating medium to the drum 22, or to discharge hot products of combustion thereto and simultaneously permit controlled escape of the hot products of combustion from the drum 22. This may be accomplished by producing the products of combustion in a separate furnace 24 and conveying the products of combustion from this furnace to the drum 22 by means of a pipe 25 which opens into one end of drum 22, the hot products of combustion being allowed to escape from the opposite end of drum 22 by means of a discharge pipe 26 having a control valve 27 to regulate such escape of the products of combustion. Suitable means as generally indicated at 28 will of course be provided for continuously rotating the drum 22 during each roasting operation, so as to continuously agitate the shells while being roasted. In this way, the shells may be uniformly heated and roasted so that a uniform product will be obtained in which not even the small particles of shells will be over-burned or over-roasted. The furnace 24 is preferably of the type employing a gas burner for producing the hot products of combustion used in the calcining operation, thus providing for the production of products of combustion having no residue to contaminate the product of the calcining operation.

In view of the above, it will be seen that I have provided a very simple and inexpensive process for the production of a good quality of lime, and whereby the small particles of shells may be utilized without being over-burned. By controlling the escape of the hot products of combustion from the kiln as explained herein, I prevent the creation of a strong draft through the kiln so that the very fine particles of shell do not form suspended dust to interfere with the calcining operation and are not carried off and lost or wasted, as would be the case if the escape of the products of combustion were not controlled or restricted. While the invention has been described as applied to oyster shells, it is intended that the invention be understood as applicable to other equivalent material, particularly to clam and other types of marine shells.

What I claim as new is:

1. A process of making lime from pieces and smaller particles of crushed oyster shells consisting of roasting successive batches of the pieces and smaller particles of shells in a rotary kiln by the controlled application of heat at calcining temperatures and so as to exclude said pieces and smaller particles of shells from contact with a flame or hot surfaces capable of burning them, during rotation of the kiln and agitation of said pieces and smaller particles.

2. A process of making lime from oyster shells and the like, including passing the shells through a crusher to reduce them to pieces and smaller particles, screening the crushed shells to eliminate the pieces of larger than a given size, and then roasting successive batches of the remaining pieces and smaller particles of shells in a rotary kiln by supplying hot products of combustion devoid of flame to said kiln from an external source and controlling only the escape of said hot products of combustion from said kiln to maintain the desired calcining temperatures within the kiln during rotation of the latter and agitation of the pieces and particles of shells being roasted.

GEORGE F. HORTON.